United States Patent
Handel et al.

(10) Patent No.: US 9,473,525 B2
(45) Date of Patent: *Oct. 18, 2016

(54) DYNAMIC LOADING AND CONFIGUATION OF THREAT DETECTORS BASED ON FEEDBACK FROM OTHER NODES

(71) Applicant: The Boeing Company, Huntington Beach, CA (US)

(72) Inventors: Mark Jonathan Handel, Seattle, WA (US); Douglas Alan Stuart, St. Charles, MO (US); Hugh L Taylor, Mukilteo, WA (US); Steven A. Dorris, Saint Peters, MO (US); Brett Michael Wilson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/502,684

(22) Filed: Sep. 30, 2014

(65) Prior Publication Data
US 2016/0094580 A1 Mar. 31, 2016

(51) Int. Cl.
*G06F 11/00* (2006.01)
*G06F 12/14* (2006.01)
(Continued)

(52) U.S. Cl.
CPC .......... *H04L 63/1441* (2013.01); *G06F 21/55* (2013.01); *H04L 63/1408* (2013.01); *H04L 67/10* (2013.01); *H04L 63/14* (2013.01);
(Continued)

(58) Field of Classification Search
CPC ............... H04L 63/14; H04L 63/1408; H04L 63/1416; H04L 63/1425; H04L 63/145; H04L 67/12
See application file for complete search history.

(56) References Cited

U.S. PATENT DOCUMENTS

| 2016/0021120 A1* | 1/2016 | Handel | H04L 67/12 726/23 |
| 2016/0021125 A1* | 1/2016 | Handel | H04L 63/1425 726/23 |

FOREIGN PATENT DOCUMENTS

CN 103679025 A * 3/2014

OTHER PUBLICATIONS

Dendritic Cells for SYN Scan Detection, Publication—Julie Greensmith and Uwe Aickelin, School of Computer Science, University of Nottingham, Nottingham, UK, NG8 1BB, 2007.*
(Continued)

*Primary Examiner* — Jayesh Jhaveri
(74) *Attorney, Agent, or Firm* — Parsons Behle & Latimer

(57) ABSTRACT

Artificial Immune Systems (AIS) including the Dendritic Cell Algorithm (DCA) are an emerging method to detect malware in computer systems. The DCA implementation may use an inflammation signal to communicate information among the processes of device or a network or among nodes of a network, where the inflammatory signal indicates a likelihood that a process or a node has been attacked by malicious software. The DCA implementation may dynamically change the malware sensitivity and responsiveness based on the inflammation signals without requiring user intervention. The inflammatory signal includes one or more inflammatory tuples, which may include multiple components such as a strength, a PrimeIndicator, and an optional third element, p. The strength component may be an indication of the magnitude of an attack and provide a degree of certainty of the attack. The PrimeIndicator may be an identifier of the indicator type that is the source of the inflammation tuple.

28 Claims, 5 Drawing Sheets

(51) Int. Cl.
    *G06F 12/16*     (2006.01)
    *G08B 23/00*     (2006.01)
    *H04L 29/06*     (2006.01)
    *H04L 29/08*     (2006.01)
    *G06F 21/55*     (2013.01)

(52) U.S. Cl.
    CPC .......... *H04L63/145* (2013.01); *H04L 63/1416* (2013.01); *H04L 63/1425* (2013.01); *H04L 67/12* (2013.01)

(56) References Cited

OTHER PUBLICATIONS

"Multiagent-Based Dendritic Cell Algorithm with Applications in Computer Security", Publication by Ou et al., Apr. 2011.*

Dendritic Cells for SYN Scan Detection, Publication—Julie Greensmith and Uwe Aickelin, School of Computer Science, University of Nottingham, Nottingham, UK, NG8 1 BB, 2007.*

Greensmith, Julie, et al, Articulation and Clarification of the Dendritic Cell Algorithm; Lecture Notes in Computer Science vol. 4163, pp. 404-417 , UK Jan. 1, 2006.

Greensmith, Julie, et al, Dendritic Cells for SYN Scan Detection; Proceedings of the Genetic and Evolutionary Computation Conference (GECCO 2007) Jan. 1, 2007, pp. 49-56.

Al-Hammadi, Yousof, DCA for Bot Detection; Proceedings of the IEEE World Congress on Computational Intelligence (WCCI2008), Hong King, p. 1807-1816, Jan. 1, 2008.

Gu, Feng, et al, Exploration of the Dendritic Cell Algorithm Using the Duration Calculus; Proceedings of 8th International Conference on Artificial Immune Systems (ICARIS 2009), Lecture Notes in Computer Science 5666, York, UK, pp. 1-13, Jan. 1, 2001.

Gu, Feng, et al, Quiet in Class: Classification, Noise and the Dendritic Cell Algorithm; Proceedings of the 10th International Conference on Artificial Immune Systems (ICARIS 2011), LNCS vol. 6825, pp. 173-186, Cambridge, UK Jan. 1, 2011.

Greensmith, Julie, The Deterministic Dendritic Cell Algorithm; Lecture Notes in Computer Science vol. 5132, pp. 291-302, Phuket, Thailand Aug. 10, 2008.

Greensmith, Julie, et al, Introducing Dendritic Cells as a Novel Immune-Inspired Algorithm for Anomaly Detection; 4th International Conference, ICARIS 2005, pp. 153-167, Banff, Alberta, Canada Aug. 14, 2005.

Gu, Feng, et al, Integrating Real-Time Analysis With the Dendritic Cell Algorithm Through Segmentation ; In Genetic and Evolutionary Computation Conference (GECCO 09), Montreal Quebec, Canada Jul. 8, 2009.

Zheng et al., Principle and Application of Dendritic Cell Algorithm for Intrusion Detection, 2011, IPCSIT vol. 48, http://www.ipcsit.com/vol48/015-ICSPS2011-S0177, pp. 85-91.

* cited by examiner

DYNAMIC LOADING AND CONFIGURATION OF THREAT DETECTORS BASED ON FEEDBACK FROM OTHER NODES

FIELD OF THE DISCLOSURE

The present application relates generally to computing security, and more particularly to systems and methods for automatically updating malware detection systems based on the Dendritic Cell Algorithm (DCA).

BACKGROUND

Malware (viruses, trojans, "advanced persistent threats," etc.) represents a significant potential risk in embedded network systems, such as, for example, computer networks in factory control systems. Safeguarding the integrity of a given network is often an important task for ensuring the overall safety of critical systems. As a result, detection of viruses and malware is an increasingly critical task in embedded systems.

Unfortunately, recent trends demonstrate that malware creators are willing to dedicate significant time and resources to the dissemination of malware, and the malware can often be cloaked and hidden in sophisticated ways. Further, continual development of malware requires users to continually take action to update additional malware protection in an effort to protect their devices and/or systems. Usefully, viruses and hosts have been waging an on-going war in the biological domain for many millennia. The outcome of the biological war has been a remarkably sophisticated and subtle system that can quickly detect, attack, and kill harmful invaders, while managing to avoid not only damage to the self, but also not killing other symbiotic organisms in the body.

Artificial immune systems (AIS) are a collection of algorithms developed from models or abstractions of the function of the cells of the human immune system. One category of AIS is based on the Danger Theory, and includes the Dendritic Cell Algorithm (DCA), which is based on the behavior of Dendritic Cells (DCs) within the human immune system. DCs have the power to suppress or activate the immune system through the correlation of signals from an environment, combined with location markers in the form of antigen. The function of a DC is to instruct the immune system to act when the body is under attack, policing the tissue for potential sources of damage. DCs are natural anomaly detectors, the sentinel cells of the immune system. The DCA has demonstrated potential as a static classifier for a machine learning data set and anomaly detector for real-time port scan detection.

The DCA has been described in a number of references, including Greensmith, Aickelin and Twycross, *Articulation and Clarification of the Dendritic Cell Algorithm*. In Proc. of the 5th International Conference on Artificial Immune Systems, LNCS 4163, 2006, pp. 404-417. The following features of the DCA differentiate the algorithm from other AIS algorithms: (1) multiple signals are combined and are a representation of environment or context information; (2) signals are combined with antigen in a temporal and distributed manner; (3) pattern matching is not used to perform detection, unlike negative selection; and (4) cells of the innate immune system are used as inspiration, not the adaptive immune cells, and unlike clonal selection, no dynamic learning is attempted.

As described in the DCA literature, DCs can perform various functions, depending on their state of maturation. Modulation between these maturation states is facilitated by the detection of signals within the tissue, namely: (1) danger signals, (2) pathogenic associated molecular patterns (PAMPs), (3) apoptotic signals (safe signals), and (4) inflammatory cytokines. The DCA has been implemented successfully in various localized applications, which have made use of danger signals, PAMPs, and safe signals. However, existing DCA implementations have not made use of signals analogous to the inflammatory cytokines of DCs in the biological domain. Further, existing DCA implementations do not dynamically change based on a malware attack.

SUMMARY

The present application discloses an implementation of the DCA that detects anomalous behavior in various processes in a computing device. Unlike previous approaches, the DCA implementation described herein dynamically loads and/or updates indicators based on feedback from other nodes and/or other processes.

In one example, a system for the detection of malicious software includes a first node, a second node, a first DCA module associated with the first node, and a second DCA module associated with the second node. The first DCA module uses the DCA to analyze the first node to determine if malicious software exists and the second DCA module uses the DCA to analyze the second node to determine if malicious software exists. The first DCA module generates an inflammatory signal indicating a likelihood that the first node has been attacked by malicious software and the second DCA module receives the generated inflammatory signal from the first DCA module and dynamically changes at least one parameter of at least one indicator within the second DCA module based on the received inflammatory signal from the first DCA module.

The received inflammatory signal may be a continuous variable having a value within a range of 0 to 1. The received inflammatory signal may have a strength indicator proportional to a degree of certainty that the first node has been attacked by malicious software. A sensitivity of at least one indicator of the second DCA module may be dynamically reduced by the second DCA module in response to the received inflammatory signal. A sensitivity of at least one indicator of the second DCA module may be dynamically increased by the second DCA module in response to the received inflammatory signal. The received inflammatory signal from the first DCA module may include at least one tuple, each tuple having three components, an indicator of strength of the attack by malicious software, an identifier of a type of indicator that is under attack by malicious software, and a set of parameters for an initialization of at least one indicator within the second DCA module. The parameter of at least one indicator within the second DCA module may be dynamically changed by the second DCA module based on at least one of the components of the inflammatory signal. The second DCA module may automatically change the at least one parameter of the at least one indicator within the second DCA module solely on the received inflammatory signal from the first DCA module. The second DCA module may automatically load at least one new indicator solely on the received inflammatory signal from the first DCA module. The first DCA module may dynamically unload an indicator if the indicator does not identify a harmful antigen over an extended period of time.

In one example, a system for the detection of malicious software includes a first process, a second process, a first DCA module associated with the first process, and a second DCA module associated with the second process. The first DCA module uses the DCA to analyze the first process to determine if malicious software exists and the second DCA module uses the DCA to analyze the second process to determine if malicious software exists. The first DCA module generates an inflammatory signal indicating a likelihood that the first process has been attacked by malicious software and the second DCA module receives the generated inflammatory signal from the first DCA module and dynamically changes at least one parameter of at least one indicator within the second DCA module based on the received inflammatory signal from the first DCA module.

The received inflammatory signal may be a continuous variable having a value within a range of 0 to 1. The received inflammatory signal may have a strength indicator proportional to a degree of certainty that the first process has been attacked by malicious software. A sensitivity of at least one indicator of the second DCA module may be dynamically reduced or increased by the second DCA module in response to the received inflammatory signal. The received inflammatory signal from the first DCA module may include at least one tuple, each tuple having three components, an indicator of strength of the attack by malicious software, an identifier of a type of indicator that is under attack by malicious software, and a set of parameters for an initialization of at least one indicator within the second DCA module. The at least one parameter of the at least one indicator within the second DCA module may be dynamically changed by the second DCA module based on at least one of the components of the inflammatory signal. The second DCA module may automatically change the at least one parameter of at least one indicator within the second DCA module solely on the received inflammatory signal from the first DCA module. The second DCA module may automatically load at least one new indicator solely on the received inflammatory signal from the first DCA module. The first DCA module may dynamically unload an indicator if the indicator does not identify a harmful antigen over an extended period of time.

One example of a method of operating a computer network includes running a DCA on a first DCA module, identifying a harmful antigen by an indicator of the first DCA module based on predetermined criteria by the first DCA module, and transmitting an inflammatory signal from the first DCA module to a second DCA module based on identifying the harmful antigen. The method includes receiving the transmitted inflammatory signal at the second DCA module and dynamically changing at least one parameter of at least one indicator of the second DCA module based on the received inflammatory signal.

The received inflammatory signal may be comprised of at least one tuple, each tuple may have at least three components, an indicator of strength of the attack by malicious software, an identifier of a type of indicator that was generating the strongest signal in the presence of the malicious software, and a set of parameters for an initialization of at least one indicator within the second DCA module. Dynamically changing the at least one parameter of at least one indicator of the second DCA module may be based on at least one of the components of the received inflammatory signal. Dynamically changing the at least one parameter of the at least one indicator of the second DCA module may be done automatically based solely on the received inflammatory signal. Dynamically changing the at least one indicator of the second DCA module may include decreasing or increasing a sensitivity of the indicator. Dynamically changing the at least one indicator of the second DCA module may include loading a new indicator. The method may include monitoring an indicator of a DCA module and dynamically unloading the indicator from the DCA module if the indicator does not identify a harmful antigen over an extended period of time.

Figure 1:
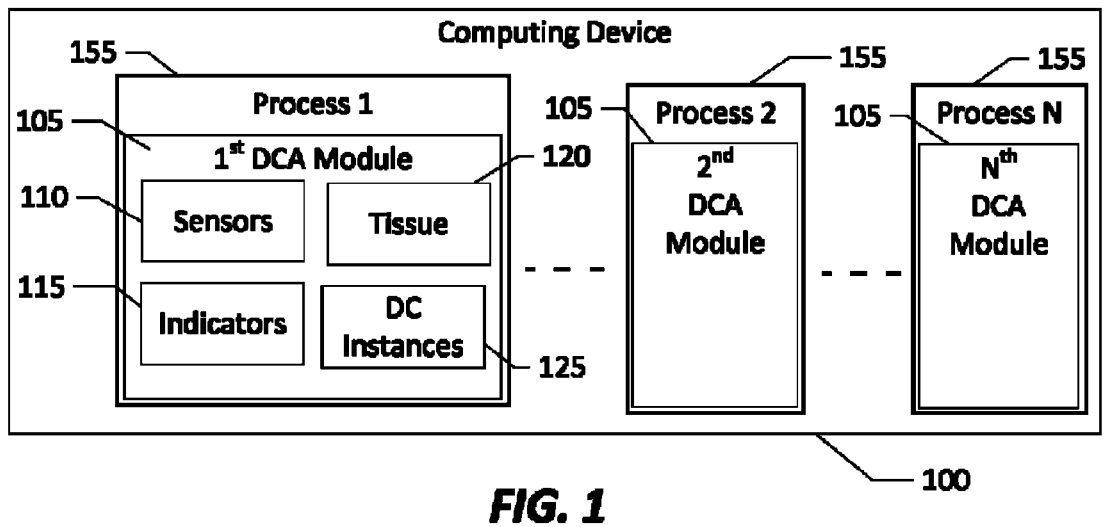
FIG. 1 is a block diagram illustrating one example of a computing device with a number of processes comprising a Dendritic Cell Algorithm (DCA) module.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present application discloses an implementation of the DCA that makes use of a known, but mostly unused, feature of the DCA: inflammation, to signal of a possible attack among processes of a computing device and/or among nodes of a distributed or a centralized network, and dynamically load and/or update malware protection based on the inflammation signal. The malware protection is updated and/or loaded, without user intervention, by updating at least one parameter of an indicator in a DCA module based on receiving the inflammation signal from another DCA module. The inflammation signal may be from a DCA module corresponding to a node or corresponding to an individual process. As used herein, the term "computing device" may refer to any device that includes a processor that is adapted to run one or more processes. As used herein, the term "network" may refer to a system with a plurality of discrete computing devices, a plurality of logical nodes within a single computing device (e.g., a plurality of virtual machines, individual computing processes, etc.), and/or a combination of discrete computing devices and logical nodes.

In some cases, as described below, various processes within a computing device run an instantiation of the DCA, which computes "signals" from the process(es), and regularly determines the potential for a particular "antigen" to be harmful, based on pre-determined criteria. The processes within the computing device are linked together through various networks, buses, or other channels of communication. When an anomaly is detected by the DCA module of one process, the module propagates an inflammation signal to other DCA modules within the computing device. This approach helps to put other processes on alert and may even dynamically change the sensitivity of the indicators of DCA modules associated with the other processes as detailed herein. In addition, this approach may dynamically load or unload indicators of DCA modules.

In some cases, as described below, each individual node within a network runs an instantiation of the DCA, which computes "signals" from the local node based on the node's current condition, and regularly determines the potential for a particular "antigen" to be harmful, based on pre-determined criteria. The nodes are linked together through a network or other channels of communication. When an anomaly is detected by the DCA module of one node, the module propagates an inflammation signal to other nodes on the network. This approach helps to put other nodes on alert and may even dynamically change the sensitivity of the indicators of DCA modules associated with the other nodes as detailed herein.

The inflammation signal may be considered as a tuple consisting of multiple components. The inflammation signal may be a list of one or more tuples. The tuple may include various components. For example, the components of the inflammation signal, also referred to herein as an inflammatory tuple, may include a strength, a PrimeIndicator, and an optional third element, p. The strength component is an indication of the magnitude or damage of the malware attack on a process and/or a node. The strength component may provide a degree of certainty that a process has been attacked by malicious software. The PrimeIndicator may be an identifier of the indicator type that is the main source of the inflammation signal. The optional third element, p, may be a set of parameters for the initialization or updating of an indicator of the DCA module receiving the inflammation signal. The DCA module may sort or filter a list of tuples received as an inflammation signal based on the magnitude of the strength value.

Previous work with the DCA has focused at the node or logical computing element. The present application contemplates a level of analysis at both the node level as well as to an individual process or partition running on a node. Process, as used herein, should be understood to include a physical or logical partition, as well as a process. A system that implements the DCA may be made up of three component parts: signal detection and processing (also called "indicators"), antigen identification, and the DCA itself, which functions as a correlation mechanism between the signals and the antigens. This DCA system may run at the individual process or partition level, one system for each process or partition running on a computing device or in a network of computing devices.

The individual instances of the DCA system can be customized based on the features of the process and/or node being examined. The features of a process can be determined at process start-up, using attributes such as process name, process security level, any resources the process declares it will use, either directly through security entitlements, or indirectly via support libraries it imports. These features are used to customize the set of indicators as well as antigen identification algorithm that the DCA system will use to monitor the health of the process. The set of indicators can also be specified by a configuration mechanism to ensure that all instances are running at least a basic set of common indicators, or that certain classes of processes all get a particular set of indicators. A system may include indicators adapted for the same situations, but located at different nodes, or processes, throughout the system and thus, these indicators may have corresponding "names" throughout the system. Likewise, a set of indicators corresponding to nodes of a network can also be specified by a configuration mechanism. These sets of indicators may also be customized dynamically by the reception of an inflammation signal from another DCA module. Likewise, individual indicator parameters may be updated and/or loaded dynamically by the reception of an inflammation signal from another DCA module.

Once an instance of the DCA system is started up, the instances may communicate in a light-weight fashion, using the inflammation signal as a way of reflecting the health of the process. This allows the process-level instances to incorporate "global" system health into their local computation about the health of the process. The use of DCA instances associated with the processes running on a computing device provides for a fine-grained examination of the integrity of the computing device. The analysis of the DCA at a process level may be beneficial. For example, where a number of different activities are being performed on a node, for instance, a common computing resource, the many different processes occurring may lead to false positives. The use of the DCA at the process level allows for specialization of the individual "detectors," while still allowing for coordination between the individual threat detectors.

FIG. 1 is a block diagram illustrating one example of a computing device 100 comprising a plurality of processes 155 and a plurality of Dendritic Cell Algorithm (DCA) modules 105. The computing device 100 may comprise various discrete computing devices (e.g., desktop computer, notebook computer, etc.), which may communicate with similar computing devices in a network. In other cases, the computing device 100 may comprise a logical "node" (e.g., virtual machine, computing process, etc.), which may operate in parallel with similar logical nodes within a single computing device. Therefore, as described above, a computing device may comprise a discrete computing device, a collection of logical nodes within a single computing device, and/or a combination of the two.

In the illustrated example, the computing device 100 comprises a plurality of processes 155 (labeled Process 1 through Process N in FIG. 1) operating in connection with DCA modules 105 within the computing device 100. In addition, each DCA module 105 may comprise a plurality of sensors 110, indicators 115, a tissue module 120, and a plurality of individual dendritic cell (DC) instances 125. The operation and interaction of the components of the DCA module 105 are described below. In FIG. 1, the DCA Module 105 is depicted within the processes 155 for illustrative purposes only as a DCA Module 105 may correspond to a process 155 without being contained within the process 155. FIG. 1 also only depicts a single computing device 100 for illustrative purposes only as processes 155 and DCA modules 105 on multiple computing devices 100 may be in communication over various networks, wired and/or wireless, as would be appreciated by one of ordinary skill in the art having the benefit of this disclosure.

Figure 2:
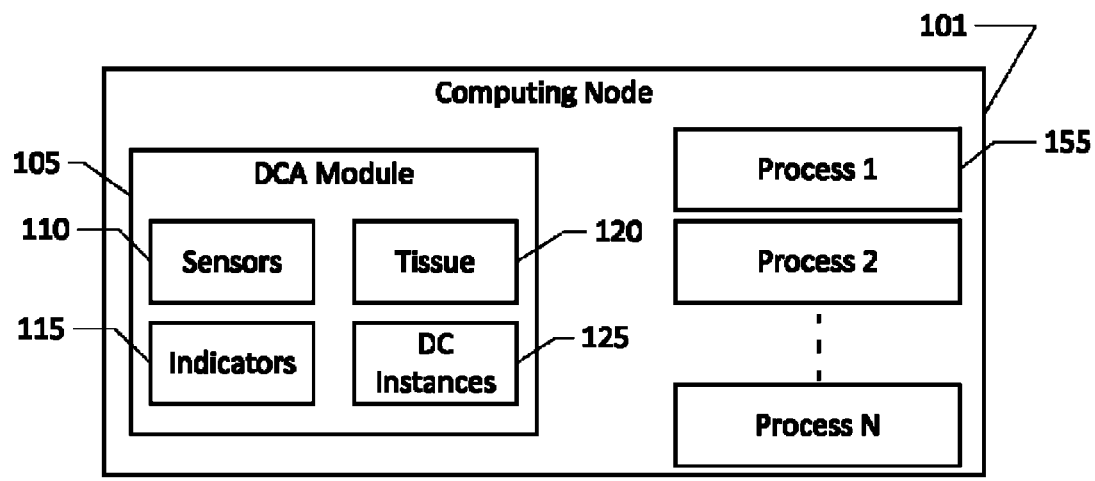
FIG. 2 is a block diagram illustrating one example of a computing node comprising a DCA module.

FIG. 2 is a block diagram illustrating one example of a computing node 101 comprising a DCA module 105. In some cases, the computing node 101 may comprise a discrete computing device (e.g., desktop computer, notebook computer, etc.), which may communicate with similar computing devices in a network. In other cases, the computing node 101 may comprise a logical "node" (e.g., virtual machine, computing process, etc.), which may operate in parallel with similar logical nodes within a single computing device. Therefore, as described above, a network of computing nodes may comprise a collection of discrete computing devices, a collection of logical nodes within a single computing device, and/or a combination of the two.

In the illustrated example, the computing node 101 comprises a plurality of processes 155 (labeled Process 1 through Process N in FIG. 2) operating in parallel with the DCA module 105 within the computing node 101. In addition, the DCA module 105 comprises a plurality of sensors 110, indicators 115, a tissue module 120, and a plurality of individual dendritic cell (DC) instances 125. The operation and interaction of the components of the DCA module 105 are described below.

Figure 3:
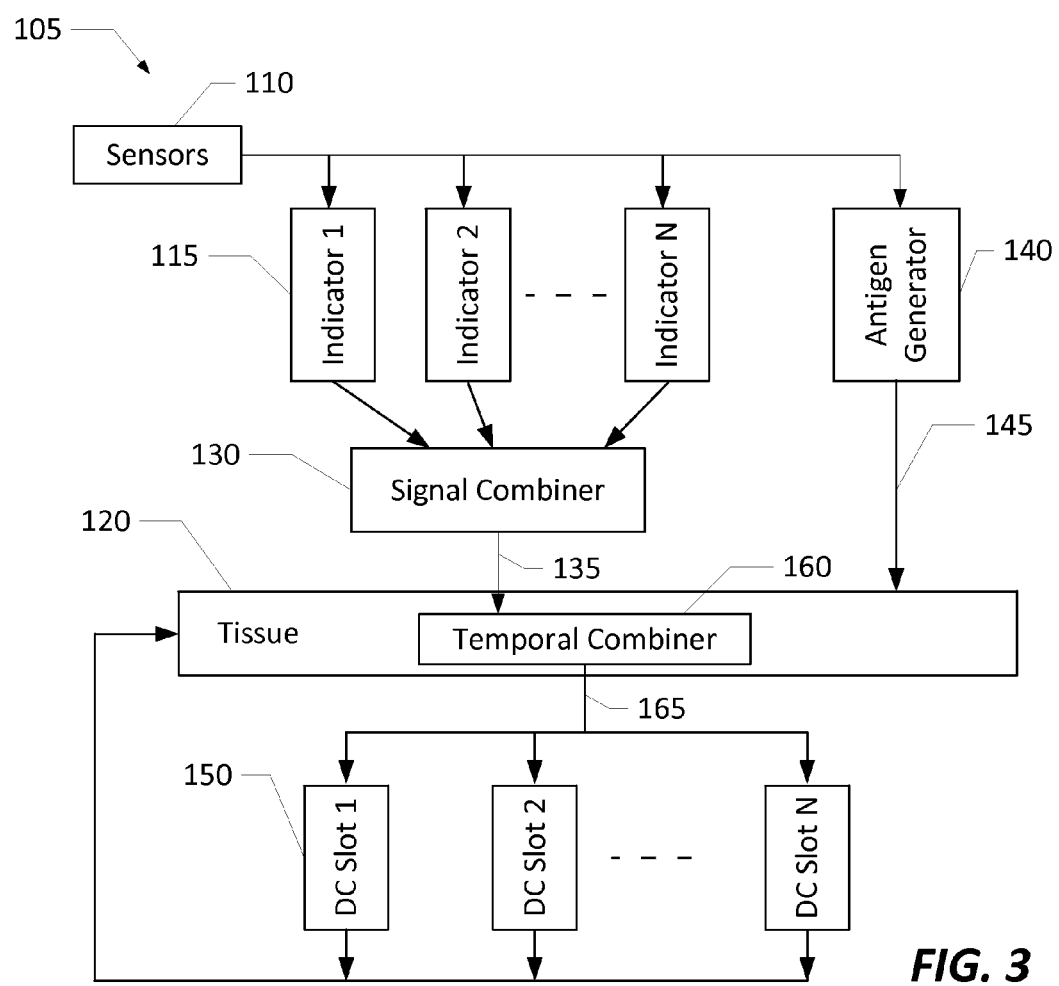
FIG. 3 is a block diagram illustrating one example of a DCA module.

FIG. 3 is a block diagram illustrating one example of a DCA module 105. In the example illustrated in FIG. 3, the DCA module 105 comprises a plurality of sensors 110, which measure raw sensor data, such as, for example, computer network information (e.g., packet data, etc.) and/or process information (e.g., processor time, memory usage, page faults, etc.). As shown in FIG. 3, the raw sensor data can be used by a selected number of DCA indicators 115 (labeled Indicator 1 through Indicator N in FIG. 3) to generate signals, which may represent a wide variety of parameters. For example, in some cases, Indicator 1 may generate a heartbeat or "keep alive" signal, Indicator 2 may generate a processor load signal or a packet size signal, and Indicator N may generate a signal representing a sender's network address. Other examples of suitable indicators 115 may include signals indicative of parameters such as bandwidth, processor memory utilization, processor load, etc.

As shown in FIG. 3, the signals generated by indicators 115 are combined by a signal combiner 130, which may perform a variety of suitable combination functions. For example, in some cases, the signal combiner 130 may sum signals from the indicators 115, whereas in other cases, the signal combiner 130 may average the signals from indicators 115. As yet another example, the signal combiner 130 may determine the median value of the signals from the indicators 115. Using a suitable combination function, the signal combiner 130 creates an aggregated indicator signal 135, which is provided as an input to the tissue module 120. In addition, the raw sensor data is used by an antigen generator 140 to create an antigen 145, which is also provided as an input to the tissue module 120. The signal combiner 130 may provide a sorted list of PrimeIndicators to a local DCA module 105. The DCA module 105 may then generate one or more inflammatory tuples, based on the magnitude of the signal strength of the PrimeIndicator list.

An aggregated signal 135 and antigen 145 are created for each individual raw sensor "event." For example, in the case of network traffic, a raw sensor event may comprise a packet, whereas in the case of processor load, a raw sensor event may comprise a selected time period (e.g., 0.1 seconds, etc.). The tissue module 120, in turn, includes a temporal combiner 160, which combines an array of one or more aggregated indicator signals 135 received over time, to generate a "DC-Seen" signal 165. In some cases, the temporal combiner 160 may average the aggregated indicator signals 135, whereas in other cases, the temporal combiner 160 may determine the maximum or median of the aggregated indicator signals 135. The temporal combiner 160 includes a "look back" period, which may correspond to a selected time period (e.g., 3 seconds) or a number of events.

In operation, the tissue module 120 manages the indicator signal 135 and the antigen 145, and provides the DC-Seen signal 165 to a plurality of individual DC instances 125 located in a plurality of DC slots 150 (labeled DC Slot 1 through DC Slot N in FIG. 3). As the individual DC instances 125 age out, they present the resulting data back to the tissue module 120, which aggregates the data across the plurality of individual DC instances 125.

Figure 4:
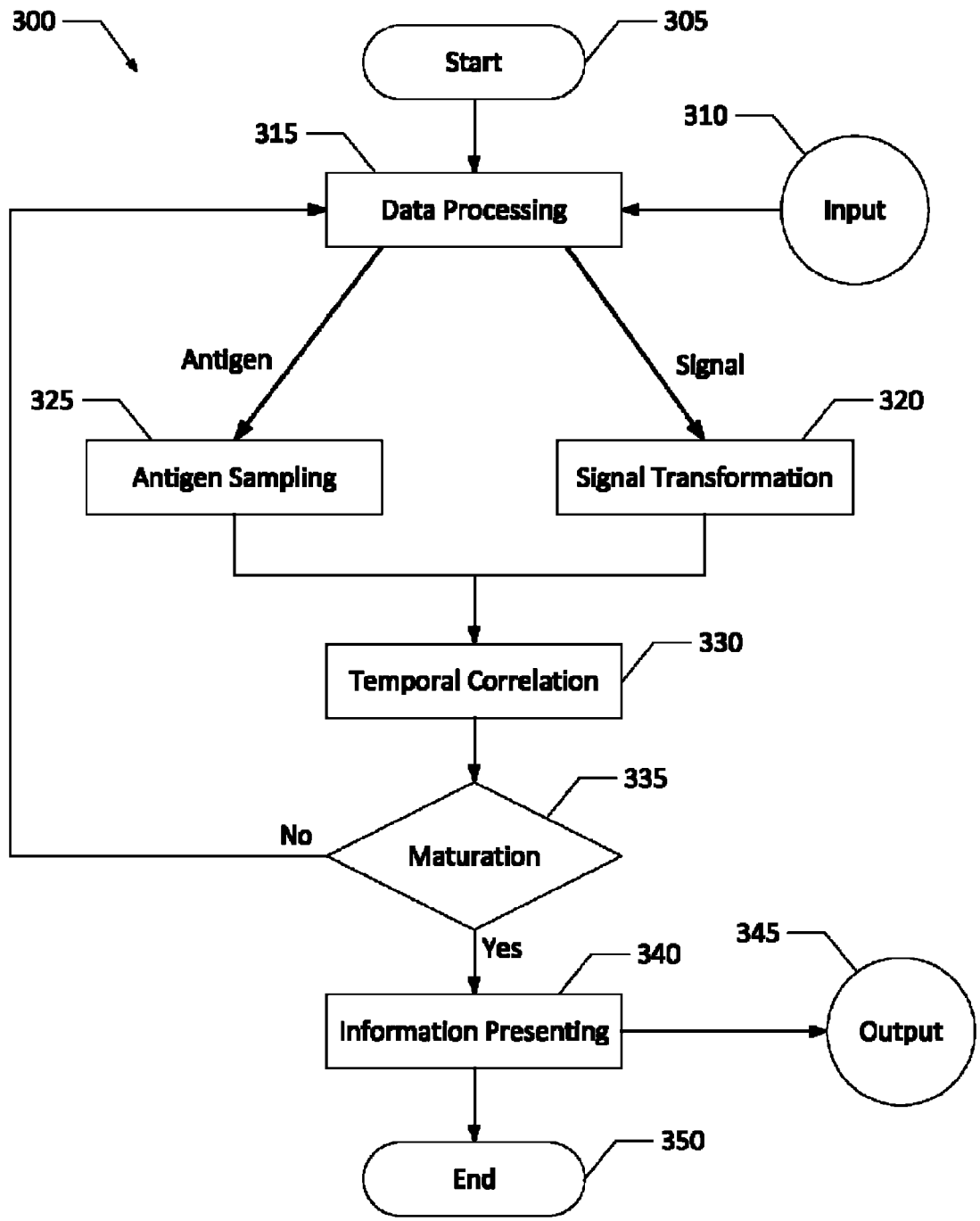
FIG. 4 is a flow chart illustrating a method of operating of an individual DC within a DCA module.

FIG. 4 is a flow chart illustrating an example of a process 300 for operating an individual DC instance 125 within a DCA module 105. In a first step 305, the DC instance 125 is created and initialized. During operation of the DC instance 125, as indicated at block 310, raw sensor data is provided by the sensors 110 of the DCA module 105. In a data processing event 315, an antigen 145 is created by the antigen generator 140, and the raw sensor data is processed to create an indicator signal 135. The antigen 145 typically represents an existing attribute of the system on which the DC instance 125 operates, such as, for example, the name of a program installed on the computing device 100 or the computing node 101, a file name, an address of another node 101 on the same network, etc. In addition, as known in the DCA art, the indicator signal 135 may comprise a vector of the following signals: (a) PAMP, (b) Danger, (c) Safe, and (d) Inflammation signal.

The indicator signal 135 is passed to a signal transformation event 320. The antigen 145 is passed to an antigen sampling event 325. In each DC instance 125, a single indicator signal 135 and zero, one or more antigens 145 can be fed to the DC instance 125. The processed indicator signals 135 and sampled antigen 145 are correlated by a temporal correlation event 330 based on their time stamps. In a decision block 335, the process 300 determines whether a maturation threshold has been reached. If not, the process 300 returns to the data processing event 315. The DC instance 125 repeats the events described above cyclically, until the maturation threshold is reached, which indicates that the DC instance 125 has acquired sufficient information for decision making.

Once the DC instance 125 reaches its maturation threshold, the DC instance 125 changes from a correlating state to an information presenting state. Based on the indicator signals 135 and the antigen 145 correlated by the temporal correlation event 330, the DC instance 125 determines whether any potential anomalies appeared within the input data. The results of this decision are presented by an information presenting event 340 as the output of the DC instance 125, as indicated at block 345. In a final step 350, the DC instance 125 is terminated, marking the end of the lifespan of the DC instance 125. In many cases, the process 300 then returns to step 305, in which another DC instance 125 is created and initialized, and the process 300 is repeated.

Figure 5:
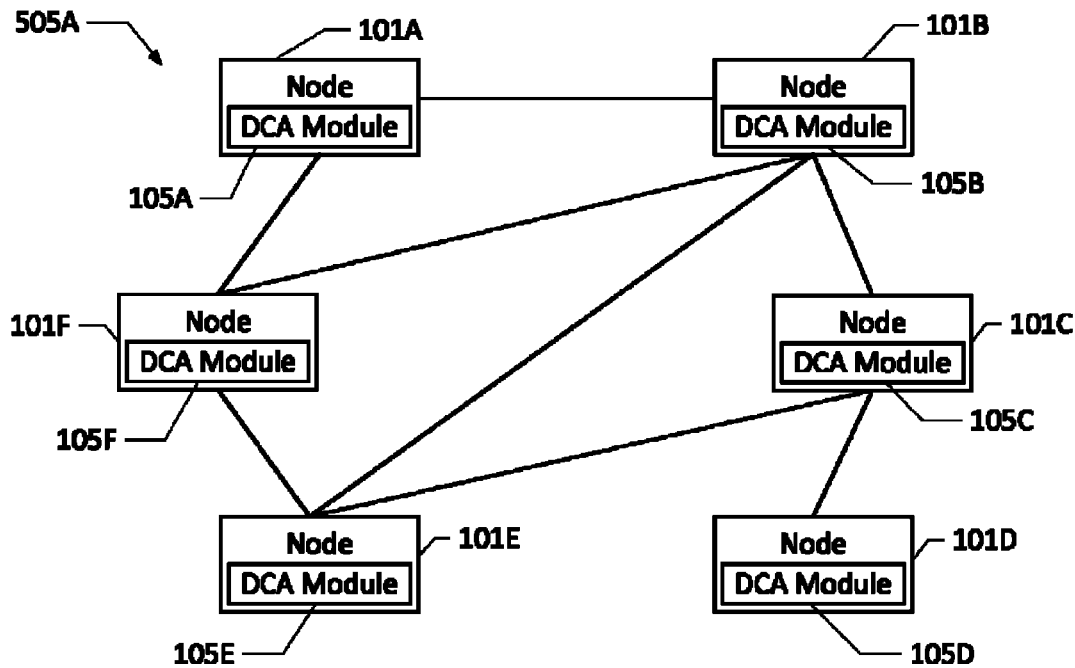
FIG. 5 is a block diagram illustrating an example of a network with a plurality of computing nodes including DCA modules.

FIG. 5 is a block diagram illustrating one example of a distributed computer network 505A (e.g., peer-to-peer network, ad hoc wireless network, etc.), having a plurality of nodes 101, each including a Dendritic Cell Algorithm (DCA) module 105. In the particular example illustrated in FIG. 5, the distributed network 505A comprises six nodes 101A-101F that are interconnected as shown. Any individual node 101 may be in communication with any other node 101 (or multiple other nodes 101) in the distributed network 505A. For example, node 101B is in communication with four other nodes 101 (i.e., nodes 101A, 101C, 101E, 101F), whereas node 101D is in communication with only one other node 101 (i.e., node 101C). Those of ordinary skill in the art will understand that the distributed network 505A may include a greater or fewer number of nodes 101, and that the interconnections between individual nodes 101 may vary widely from the example shown in FIG. 5.

Figure 6:
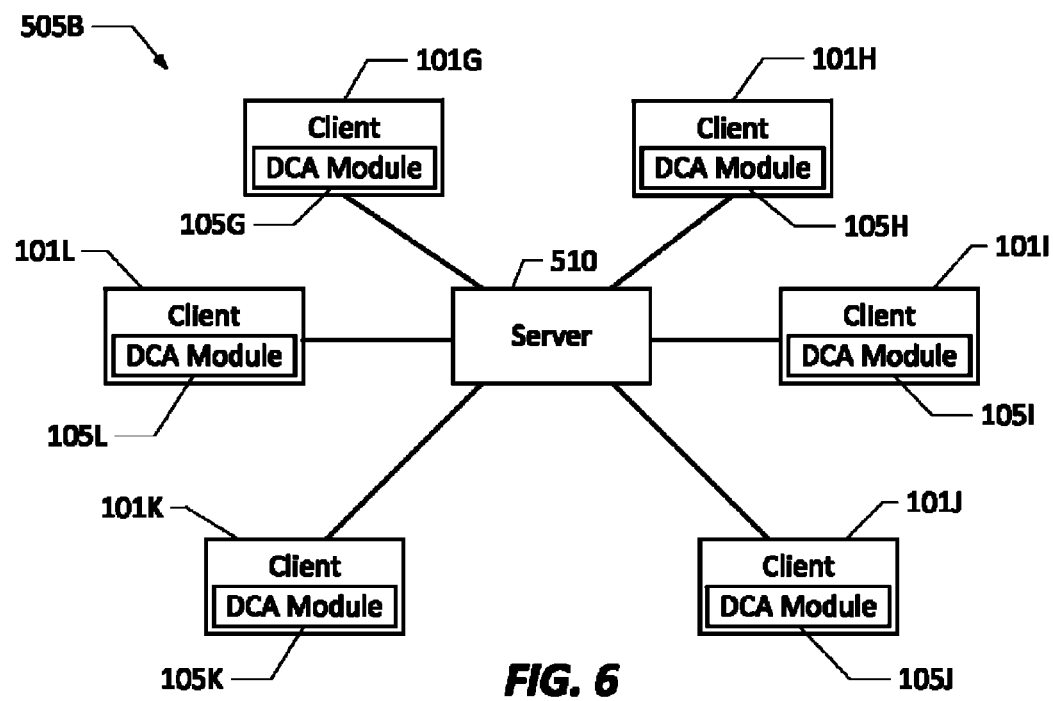
FIG. 6 is a block diagram illustrating an example of a network with a plurality of computing nodes including DCA modules.

FIG. 6 is a block diagram illustrating one example of a centralized computer network 505B (e.g., client-server network, etc.), having a central server 510 in communication with a plurality of clients or nodes 101, each including a DCA module 105. In the particular example illustrated in FIG. 6, the centralized network 505B comprises six nodes 101G-101L in communication with the central server 510 in a star network topology. Those of ordinary skill in the art will understand that the centralized network 505B may include a greater or fewer number of nodes 101, and that a variety of other suitable network topologies (e.g., bus network, ring network, etc.) may be employed.

The DCA module 105 associated with any process 155 within a computing device 100 may be in communication with other DCA modules 105 as shown in FIG. 1. In operation, the DCA modules 105 constantly monitor the processes 155 for abnormal activity, which may be identified as a harmful antigen based on selected criteria, as described above in connection with FIG. 4. When such a harmful antigen is identified for a particular process 155, the corresponding DCA module 105 may transmit an inflammatory signal to the remaining processes 155 with corresponding DCA modules 105 within the computing device 100. Likewise, the DCA module 105 associated with any node 101 within a network may be in communication with other DCA modules 105 within the network as shown in FIG. 5 and as shown in FIG. 6. When such a harmful antigen is identified for a particular node 101, the corresponding DCA module 105 may transmit an inflammatory signal to the remaining nodes 101 with corresponding DCA modules 105 within the network. The inflammatory tuple may be used by the receiving DCA module to dynamically update at least one parameter of at least one indicator within the DCA module.

The inflammatory signal may be composed of one or more inflammatory tuples, which in turn may be comprised of multiple components. For example, the components of the inflammatory tuple may include a strength, a PrimeIndicator, and an optional third element, p. The strength component may be an indication of the magnitude or damage of the malware attack. The strength component may also provide a degree of certainty that a process has been attacked by malicious software. The PrimeIndicator may be an identifier of the indicator type that is the source of the inflammation tuple. The PrimeIndicator may indicate to a receiving DCA module as to what indicator(s) may need to be dynamically modified. The optional third element, p, may be a set of parameters for the initialization or updating of an indicator of the DCA module receiving the inflammatory tuple. These components of an inflammatory tuple are for illustrative purposes only as the inflammatory tuple could include more than three components and may include various data components that differ from the above described components, such as the number of DCs or how long a DC stays alive, as would be appreciated by one of ordinary skill in the art having the benefit of this disclosure. The inflammatory tuple may cause the DCA module to automatically modify an indicator and/or load a new indicator without any user intervention. The dynamic update of indicators may better protect computer devices and/or networks than systems that require updates to be initialized by a user or system administrator.

This inflammatory tuple is analogous to the human immune system's inflammatory cytokines (e.g., interferon, tumor necrosis factor, etc.). The inflammatory signal is used to indicate to other processes 155 and/or nodes 101 having corresponding DCA modules 105 that a possible attack is underway, and for the other DCA modules 105 to modulate their response to local signal changes. The inflammatory tuple's strength component may be a continuous variable, which may range from 0 to 1 in some cases. The inflammatory signal is raised when one or more antigens have been detected as a possible invader, or a known event has occurred, or for some other reason, such as a suspicion or warning of an attack.

Figure 7:
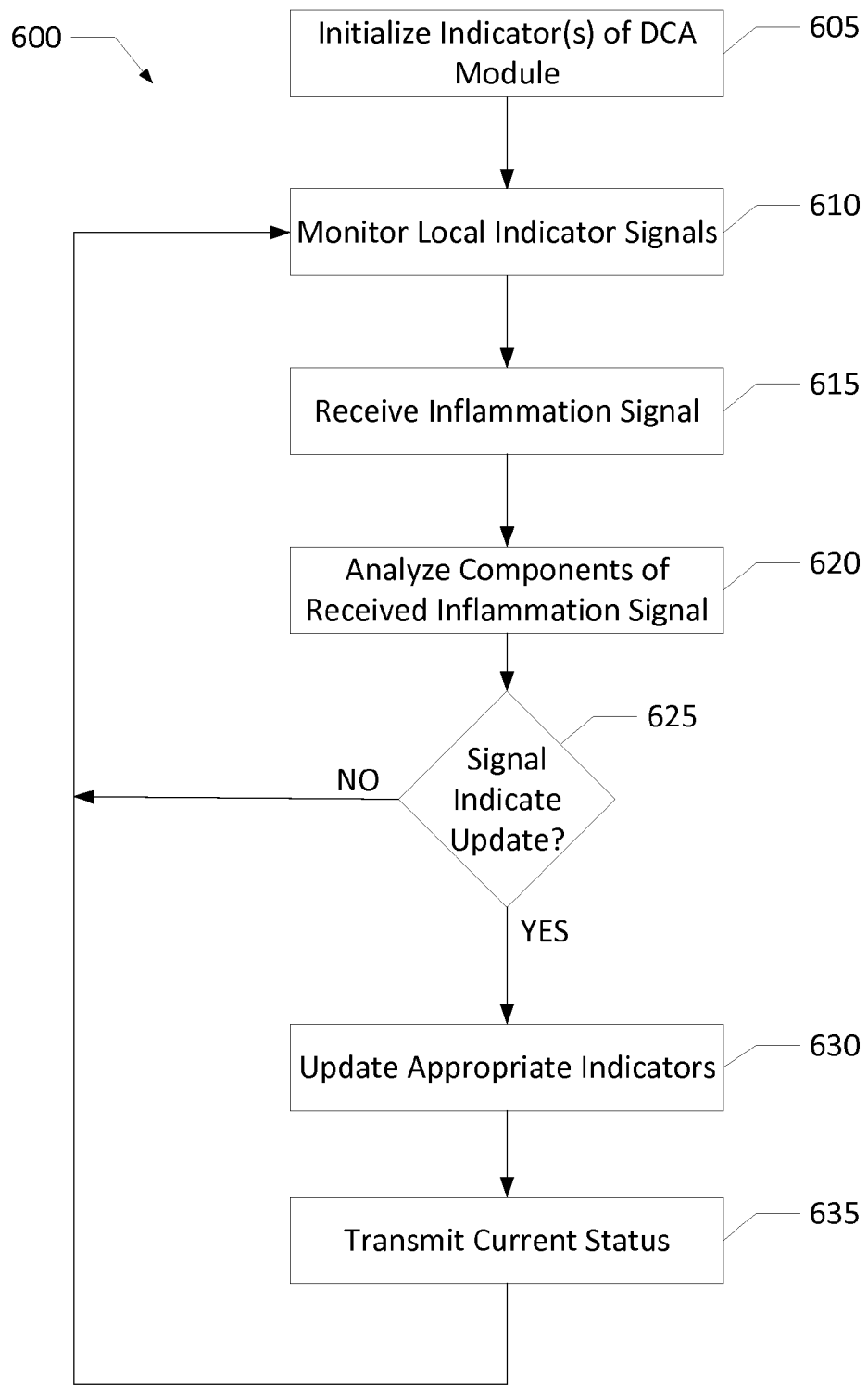
FIG. 7 is a flow chart showing one example of a method of dynamically updating an indicator(s) of a DCA module.

FIG. 7 is a flow chart illustrating an example of a method 600 of dynamically updating an indicator or indicators 115 of a DCA module 105 upon receiving an inflammation signal from another DCA module 105. In the illustrated example, the process 600 begins with a first step 605, in which the DCA module 105 of a given node 101 of a network or a DCA module 105 of given process 155 in a computing device 100 is initialized. In a next step 610, the DCA module 105 monitors the local indicator signals 135 (e.g., PAMP, Danger, and Safe) collected locally at the node 101 or the process 155. In a next step 615, the DCA module 105 receives an inflammation signal, which may be sent from another node 101 of a distributed network 505A or from the central server 510 of a centralized network 505B or from another process 155 on a computing device 100, as described above. In a next step 620, the DCA module 105 analyzes the components of the inflammation signal. As discussed above, the inflammation signal may include various components. For example, the inflammation signal may include one or more inflammatory tuples, each of each of which may include a strength indicator, an identifier for the indicator that is the primary source of the inflammation signal, and/or a set of parameters for the initialization of an indicator.

In a next step 625, the DCA module 105 determines whether the components of the inflammation signal indicate that an indicator(s) should be updated or initialized. This determination may be done on the basis of the magnitude of each strength indicator of the constituent inflammatory tuples of the inflammation signal. If the DCA module 105 determines that the indicator(s) should not be updated based on at least one of the inflammation tuples, the DCA module returns to step 610 and continues to monitor the local indicator signals. If the DCA module 105 determines that the indicator(s) should be updated based on the inflammation tuple, the method moves on to step 630. In step 630, the DCA module dynamically updates or initializes an indicator(s) of the DCA module 105. The update is done dynamically and automatically. In other words, the update is done without need for user or administrator intervention. The inflammation signal itself may provide the parameters necessary for the update of the indicator(s). In a next step 635, the DCA module 105 transmits the current status of the node 101 or process 155 to other DCA modules 105 in the computing device 100 and/or network.

The systems and methods described above demonstrate a number of distinct advantages over previous approaches. For example, the DCA module 105 of the present application demonstrates an ability to dynamically update indicators without user intervention. The indicators are updated based on a malware attack and thus, may better protect the computer device and/or network.

Although various embodiments have been shown and described, the present disclosure is not so limited and will be understood to include all such modifications and variations are would be apparent to one skilled in the art.

What is claimed is:

1. A system for detection of malicious software comprising:
    a processor;
    a memory comprising instructions stored therein which when executed, implement:
    a first node;
    a second node;
    a first dendritic cell algorithm (DCA) module associated with the first node, wherein the first DCA module uses a DCA to analyze the first node to determine if malicious software exists;
    a second dendritic cell algorithm (DCA) module associated with the second node, wherein the second DCA module uses a DCA to analyze the second node to determine if malicious software exists;
    wherein the first DCA module generates an indicator comprising a pathogenic associated molecular patterns (PAMP) signal, a danger signal, a safe signal, and an inflammatory signal, the inflammatory signal indicating a likelihood that the first node has been attacked by malicious software; and
    wherein the second DCA module receives the generated inflammatory signal from the first DCA module and dynamically changes at least one parameter of at least one indicator within the second DCA module based on the received inflammatory signal from the first DCA module.

2. The system of claim 1, wherein the received inflammatory signal comprises a continuous variable having a value within a range of 0 to 1.

3. The system of claim 1, wherein the received inflammatory signal has a strength indicator proportional to a degree of certainty that the first node has been attacked by malicious software.

4. The system of claim 1, wherein a sensitivity of at least one indicator of the second DCA module is dynamically reduced by the second DCA module in response to the received inflammatory signal.

5. The system of claim 1, wherein a sensitivity of at least one indicator of the second DCA module is dynamically increased by the second DCA module in response to the received inflammatory signal.

6. The system of claim 1, wherein the received inflammatory signal from the first DCA module comprises at least one tuple, each tuple comprising three components, an indicator of a strength of an attack by malicious software, an identifier of a type of indicator that is under attack by malicious software, and a set of parameters for an initialization of at least one indicator within the second DCA module.

7. The system of claim 6, wherein at the least one parameter of the at least one indicator within the second DCA module is dynamically changed by the second DCA module based on at least one of the components of the inflammatory signal.

8. The system of claim 1, wherein the second DCA module automatically changes the at least one parameter of the at least one indicator within the second DCA module solely on the received inflammatory signal from the first DCA module.

9. The system of claim 1, wherein the second DCA module automatically loads at least one new indicator solely on the received inflammatory signal from the first DCA module.

10. The system of claim 1, wherein the first DCA module dynamically unloads an indicator if the indicator does not identify a harmful antigen over an extended period of time.

11. A system for detection of malicious software comprising
    a processor;
    a memory comprising instructions stored therein which when executed, implement:
    a first process;
    a second process;
    a first dendritic cell algorithm (DCA) module associated with the first process, wherein the first DCA module uses a DCA to analyze the first process to determine if malicious software exists;
    a second dendritic cell algorithm (DCA) module associated with the second process, wherein the second DCA module uses a DCA to analyze the second process to determine if malicious software exists;
    wherein the first DCA module generates an indicator comprising a pathogenic associated molecular patterns (PAMP) signal, a danger signal, a safe signal, and an inflammatory signal, the inflammatory signal indicating a likelihood that the first process has been attacked by malicious software; and
    wherein the second DCA module receives the inflammatory signal from the first DCA module and dynamically changes at least one parameter of at least one indicator within the second DCA module based on the received inflammatory signal from the first DCA module.

12. The system of claim 11, wherein the received inflammatory signal comprises a continuous variable having a value within a range of 0 to 1.

13. The system of claim 11, wherein the received inflammatory signal has a strength indicator proportional to a degree of certainty that the first process has been attacked by malicious software.

14. The system of claim 11, wherein a sensitivity of at least one indicator of the second DCA module is dynamically reduced by the second DCA module in response to the received inflammatory signal.

15. The system of claim 11, wherein a sensitivity of at least one indicator of the second DCA module is dynamically increased by the second DCA module in response to the received inflammatory signal.

16. The system of claim 11, wherein the received inflammatory signal from the first DCA module comprises at least one tuple, each tuple comprising three components, an indicator of a strength of the attack by malicious software, an identifier of a type of indicator that is under attack by malicious software, and a set of parameters for an initialization of at least one indicator within the second DCA module.

17. The system of claim 16, wherein the at least one parameter of the at least one indicator within the second DCA module is dynamically changed by the second DCA module based on at least one of the components of the received inflammatory signal.

18. The system of claim 11, wherein the second DCA module automatically changes the at least one parameter of at least one indicator within the second DCA module solely on the received inflammatory signal from the first DCA module.

19. The system of claim 11, wherein the second DCA module automatically loads at least one new indicator solely on the received inflammatory signal from the first DCA module.

20. The system of claim 11, wherein the first DCA module dynamically unloads an indicator if the indicator does not identify a harmful antigen over an extended period of time.

21. A method of operating a computer network comprising:
- running a Dendritic Cell Algorithm (DCA) on a first DCA module;
- identifying a harmful antigen by an indicator of the first DCA module based on predetermined criteria established by the first DCA module, the indicator comprising a pathogenic associated molecular patterns (PAMP) signal, a danger signal, a safe signal, and an inflammatory signal, the inflammatory signal indicating a likelihood that the first process has been attacked by malicious software;
- transmitting the inflammatory signal from the first DCA module to a second DCA module based on the identifying a harmful antigen;
- receiving the transmitted inflammatory signal at the second DCA module; and
- dynamically changing at least one parameter of at least one indicator of the second DCA module based on the received inflammatory signal.

22. The method of claim 21, wherein the received inflammatory signal is comprised of at least one tuple, each tuple comprising at least three components, an indicator of a strength of the attack by malicious software, an identifier of a type of indicator that is under attack by malicious software, and a set of parameters for an initialization of at least one indicator within the second DCA module.

23. The method of claim 22, wherein the at least one parameter of at least one indicator within the second DCA module is dynamically changed by the second DCA module based on at least one of the components of the received inflammatory signal.

24. The method of claim 21, wherein dynamically changing the at least one parameter of the at least one indicator of the second DCA module is done automatically by the second DCA module solely on the received inflammatory signal from the first DCA module.

25. The method of claim 21, wherein dynamically changing the at least one parameter of the at least one indicator of the second DCA module further comprises decreasing a sensitivity of the indicator.

26. The method of claim 21, wherein dynamically changing the at least one parameter of the at least one indicator of the second DCA module further comprises increasing a sensitivity of the indicator.

27. The method of claim 21, wherein dynamically changing the at least one parameter of the at least one indicator of the second DCA module further comprises loading a new indicator.

28. The method of claim 21, further comprising:
- monitoring an indicator of a DCA module; and
- dynamically unloading the indicator from the DCA module if the indicator does not identify a harmful antigen over an extended period of time.

\* \* \* \* \*